(12) United States Patent
Fang et al.

(10) Patent No.: US 11,099,272 B2
(45) Date of Patent: Aug. 24, 2021

(54) INTELLIGENT ROADSIDE UNIT

(71) Applicant: BAIDU ONLINE NETWORK TECHNOLOGY (BEIJING) CO., LTD., Beijing (CN)

(72) Inventors: Lei Fang, Beijing (CN); Haisong Wang, Beijing (CN); Xing Hu, Beijing (CN); Sheng Tao, Beijing (CN)

(73) Assignee: BEIJING ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 192 days.

(21) Appl. No.: 16/546,548

(22) Filed: Aug. 21, 2019

(65) Prior Publication Data

US 2020/0072966 A1 Mar. 5, 2020

(30) Foreign Application Priority Data

Aug. 31, 2018 (CN) .......................... 201811015656.5

(51) Int. Cl.
*G01S 13/931* (2020.01)
*G06K 9/00* (2006.01)
(Continued)

(52) U.S. Cl.
CPC .......... *G01S 13/931* (2013.01); *G01S 13/867* (2013.01); *G06K 9/00825* (2013.01); *G01S 2013/93271* (2020.01)

(58) Field of Classification Search
None
See application file for complete search history.

(56) References Cited

U.S. PATENT DOCUMENTS 5,289,183 A * 2/1994 Hassett ................ G08G 1/0104
340/905
6,466,862 B1 * 10/2002 DeKock .............. G08G 1/0104
340/901
(Continued)

FOREIGN PATENT DOCUMENTS

CN 107945540 A 4/2018
CN 1080010360 A 5/2018
(Continued)

OTHER PUBLICATIONS

Office Action for Japanese Application No. 2019-149369, dated Nov. 4, 2020, 7 pages.
(Continued)

*Primary Examiner* — Bernarr E Gregory
(74) *Attorney, Agent, or Firm* — Fay Sharpe LLP

(57) ABSTRACT

The present disclosure provides an intelligent roadside unit. The intelligent roadside unit includes: a radar, configured to detect an obstacle within a first preset range of the intelligent roadside unit; a camera, configured to capture an image within a second preset range of the intelligent roadside unit; a radar-signal processor, coupled to the radar and configured to generate an obstacle detection signal according to obstacle information detected by the radar; an image-signal processor, coupled to the camera and configured to generate an image detection signal according to the image captured by the camera; and a general control processor, coupled to the radar-signal processor and the image-signal processor and generating a point cloud image according to the obstacle detection signal and the image detection signal.

11 Claims, 2 Drawing Sheets

(51) Int. Cl.
*G01S 13/86* (2006.01)
*G01S 13/00* (2006.01)

(56) References Cited

U.S. PATENT DOCUMENTS

| | | | | |
|---|---|---|---|---|
| 6,489,920 | B1* | 12/2002 | Anders | G08G 1/04 |
| | | | | 340/934 |
| 8,692,690 | B2* | 4/2014 | Dalal | G01S 13/92 |
| | | | | 340/936 |
| 9,418,546 | B1* | 8/2016 | Whiting | G08G 1/065 |
| 9,684,064 | B2* | 6/2017 | Nagy | G01S 13/92 |
| 10,436,898 | B2* | 10/2019 | Kurata | G01S 13/931 |
| 2002/0145541 | A1* | 10/2002 | Matsui | G08G 1/017 |
| | | | | 340/934 |
| 2011/0035140 | A1* | 2/2011 | Candy | G08G 1/052 |
| | | | | 701/119 |
| 2014/0240167 | A1* | 8/2014 | Cho | G08G 1/052 |
| | | | | 342/104 |
| 2014/0307087 | A1 | 10/2014 | Evanitsky et al. | |
| 2014/0312749 | A1* | 10/2014 | Paetzoldt | G08G 1/054 |
| | | | | 312/223.1 |

FOREIGN PATENT DOCUMENTS

| | | | | |
|---|---|---|---|---|
| EP | 3291204 | A1 * | 3/2018 | ............ G08G 1/04 |
| JP | 2001184591 | A | 7/2001 | |
| JP | 2003302470 | A | 10/2003 | |
| JP | 2005165752 | A | 6/2005 | |
| JP | 2010250743 | A | 11/2010 | |
| JP | 2016153775 | A | 8/2016 | |
| WO | 2005066656 | A1 | 7/2005 | |

OTHER PUBLICATIONS

Extended European Search Report for EP Application No. 19191483.7, dated Feb. 14, 2020, 8 pages.
Office Action for Japanese Application No. 2019-149369, dated Jun. 15, 2021, 3 pages.
Office Action for Chinese Application No. 201811015656.5, dated Jul. 14, 2021, 7 pages.

* cited by examiner

INTELLIGENT ROADSIDE UNIT

CROSS-REFERENCE TO RELATED APPLICATION

The present application is based upon and claims priority to Chinese Patent Application No. 201811015656.5, filed on Aug. 31, 2018, the entirety contents of which are incorporated herein by reference.

FIELD

The present disclosure relates to a field of transportation technology, and more particularly, to an intelligent roadside unit.

BACKGROUND

Currently, an intelligent roadside unit is an important support for automatic drive. As requirements on intelligence level of the intelligent roadside unit increases, the sensing capability of the intelligent roadside unit is requested to be increasingly higher, such that various sensing detectors need to be disposed on the intelligent roadside unit to improve the active sensing of the intelligent roadside unit. However, since the intelligent roadside unit needs to process a large amount of data, requirements on computing hardware are very high, such that costs of the hardware of the intelligent roadside unit are very high, leading to a slow popularization process of the intelligent roadside unit.

Consequently, how to reduce the costs of the intelligent roadside unit is an urgent problem to be solved.

SUMMARY

The present disclosure aims at solving at least one of the technical problems in the related art to some extent.

To this end, an objective of the present disclosure is to propose an intelligent roadside unit.

To implement the above objective, embodiments of the present disclosure propose an intelligent roadside unit, including: a radar, configured to detect an obstacle within a first preset range of the intelligent roadside unit; at least one camera, configured to capture an image within a second preset range of the intelligent roadside unit; a radar-signal processor, coupled to the radar and configured to generate an obstacle detection signal according to obstacle information detected by the radar; an image-signal processor, coupled to the camera and configured to generate an image detection signal according to the image captured by the camera; and a general control processor, coupled to the radar-signal processor and the image-signal processor and generating a point cloud image according to the obstacle detection signal and the image detection signal.

Additional aspects and advantages of the present disclosure will be given in the following description, some of which will become apparent from the following description or be learned from practices of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Embodiments of the present disclosure are described below in detail, examples of the embodiments are shown in accompanying drawings, and reference signs that are the same or similar from beginning to end represent the same or similar components or components that have the same or similar functions. The embodiments described below with reference to the accompanying drawings are exemplary, are merely used to explain the present disclosure, and cannot be construed as a limit to the present disclosure.

An intelligent roadside unit according to embodiments of the present disclosure will be described with reference to the drawings.

From the description of the background, it may be understood that with the rapid development of automatic drive, requirements on the sensing capacity of the intelligent roadside unit are becoming higher and higher. Consequently, the intelligent roadside unit needs to process a large amount of data, and thus requirements on computing hardware are very high, such that costs of the hardware of the intelligent roadside unit are very high, leading to a slow popularization process of the intelligent roadside unit.

Embodiments of the present disclosure propose an intelligent roadside unit. The intelligent roadside unit includes: a radar, a camera, a radar-signal processor, an image-signal processor and a general control processor. The radar is configured to detect an obstacle within a first preset range of the intelligent roadside unit. The camera is configured to capture an image within a second preset range of the intelligent roadside unit. The radar-signal processor is coupled to the radar and configured to generate an obstacle detection signal according to obstacle information detected by the radar. The image-signal processor is coupled to the camera and configured to generate an image detection signal according to the image captured by the camera. The general control processor is coupled to the radar-signal processor and the image-signal processor, and generates a point cloud image according to the obstacle detection signal and the image detection signal.

The intelligent roadside unit provided by embodiments of the present disclosure may be applied to a driverless car (a self-driving vehicle).

Figure 1:
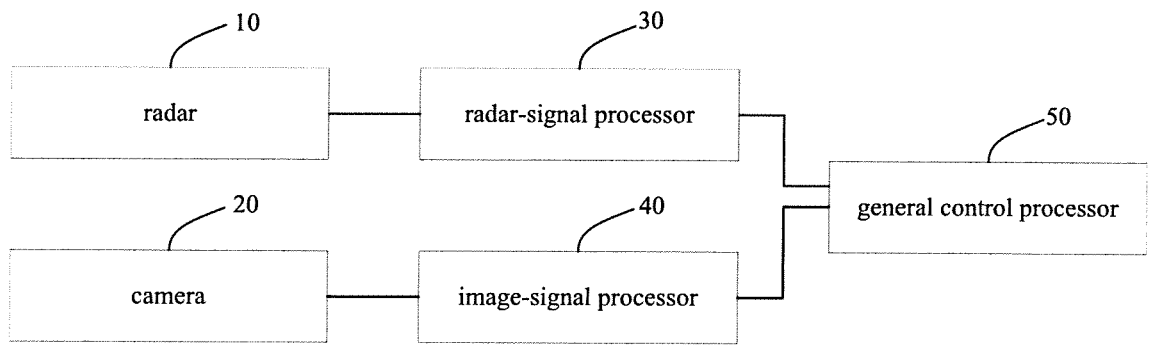
FIG. 1 is a structure schematic diagram of an intelligent roadside unit according to an embodiment of the present disclosure.

FIG. 1 is a structure schematic diagram of an intelligent roadside unit according to embodiments of the present disclosure. As shown in FIG. 1, the intelligent roadside unit includes: a radar 10, at least one camera 20, a radar-signal processor 30, an image-signal processor 40 and a general control processor 50.

The radar 10 is configured to detect an obstacle within the first preset range of the intelligent roadside unit.

The camera 20 is configured to capture an image within the second preset range of the intelligent roadside unit.

The radar-signal processor 30 is coupled to the radar 10 and configured to generate an obstacle detection signal according to obstacle information detected by the radar 10.

The image-signal processor 40 is coupled to the camera 20 and configured to generate an image detection signal according to the image captured by the camera 20.

The general control processor 50 is coupled to the radar-signal processor 30 and the image-signal processor, and generates a point cloud image according to the obstacle detection signal and the image detection signal.

Specifically, according to practical application needs, one or more radars 10 may be arranged to detect an obstacle within the first preset range of the intelligent roadside unit. The first preset range may be set according to practical application requirements.

In a possible implementation, the intelligent roadside unit according to embodiments of the present disclosure is applied to a vehicle A, and the radar 10 may detect an obstacle (for example, another vehicle, a pedestrian or a building that is less than one meter from the vehicle A) within a certain range from the vehicle A.

Figure 2:
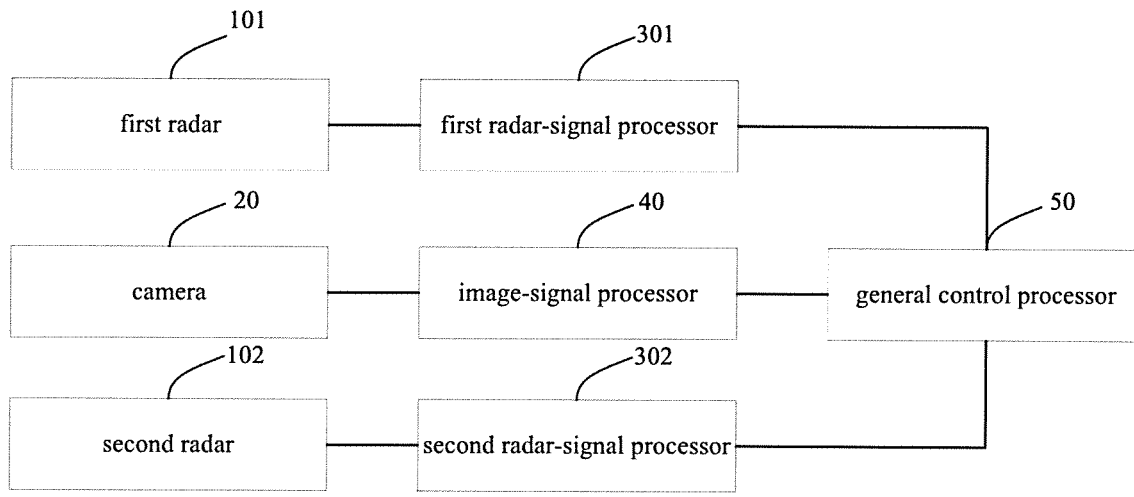
FIG. 2 is a structure schematic diagram of an intelligent roadside unit according to another embodiment of the present disclosure.

In a possible implementation, as illustrated in FIG. 2, the radar 10 includes: a first radar 101 and a second radar 102.

In practical applications, the first radar 101 is configured to detect a distant obstacle while the second radar 102 is configured to detect a nearby obstacle. A detection range of the first radar 101 may be arranged broader than a detection range of the second radar 102, thereby further improving the reliability of the radar on detecting an obstacle and lowering the costs of the intelligent roadside unit.

In a possible implementation, the intelligent roadside unit according to embodiments of the present disclosure is applied to the vehicle A. The second radar 102 detects an obstacle such as another vehicle, a pedestrian and a building that is less than one meter from the vehicle A; and the first radar 101 detects an obstacle such as another vehicle, a pedestrian and a building that is more than one meter, but less than two meters from the vehicle A.

It should be noted that the intelligent roadside unit according to embodiments of the present disclosure is applied to a field of automatic drive. The second radar 102 is mainly applied to blind zone detection (blind zone monitoring), lane keeping and lane changing assist, collision alarm or anti-collision protection of a rear radar, parking assist, traffic monitoring at an intersection and on the like.

It should be noted that the intelligent roadside unit according to embodiments of the present disclosure is applied to the field of autonomous driving. The first radar 101 is applied to braking assist, autonomous distance control and on the like.

The radar-signal processor 30 includes a first radar-signal processor 301 and a second radar-signal processor 302 coupled to the first radar 101 and the second radar 102 respectively. Consequently, distributing the computation power to a plurality of processors by arranging processors may further lower requirements on the processing capacity of the processors and reducing the costs of the processors.

It should be noted that the type of the first radar 101 and the second radar 102 may be chosen according to practical application requirements, thereby further improving obstacle detection ability. Examples are illustrated as follows.

In a first example, the first radar 101 and the second radar are both laser radars. The laser radar is mainly used for measuring a distance from a fixed or movable object.

The first radar 101 is a 64-channel laser radar, and the second radar 102 is a 16-channel laser radar.

In a second example, the first radar 101 is a laser radar, and the second radar 102 is a millimeter-wave radar. The millimeter-wave radar is the sensor having all-weather all-day characteristics, and its accuracy of speed measurement and ranging is much higher than that of vision.

It should be noted that positions of the radar 10 and the camera 20 may be arranged according to practical application needs. In a possible implementation, the first radar 101 may be arranged above the camera 20, and the second radar 102 may be arranged below the camera 20.

Specifically, one or more cameras 20 may be arranged according to practical application requirements to capture an image within the second preset range of the intelligent roadside unit. The second preset range may be set according to practical application requirements.

In a possible implementation, the intelligent roadside unit according to embodiments of the present disclosure is applied to the vehicle A, and the camera 20 may capture an image (for example, another vehicle, a pedestrian or an intersection indicator that is less than one meter from the vehicle A) within a certain range from the vehicle A.

In an example, there are a plurality of cameras 20 which are correspond to intersections monitored by the intelligent roadside unit. By ranging cameras 20 at different positions and in different directions, the accuracy and reliability of the point cloud image may be improved.

Specifically, the radar-signal processor 30 is coupled to the radar 10, and the radar 10 sends detected obstacle information to the radar-signal processor 30, such that the radar-signal processor 30 processes the detected obstacle information to generate an obstacle detection signal to be sent to the general control processor 50. The image-signal processor 40 is coupled to the camera 20, and the camera 20 sends a captured image to the image-signal processor 40, such that the image-signal processor 40 processes the captured image to generate an image detection signal to be sent to the general control processor 50. Consequently, the general control processor 50 generates a point cloud image according to the obstacle detection signal and the image detection signal.

With the intelligent roadside unit according to embodiments of the present disclosure, an obstacle within the first preset range of the intelligent roadside unit is detected through the radar. The camera captures an image within the second preset range of the intelligent roadside unit. The radar-signal processor coupled to the radar is configured to generate an obstacle detection signal according to obstacle information detected by the radar. The image-signal processor coupled to the camera is configured to generate an image detection signal according to the image captured by the camera. The general control processor is coupled to the radar-signal processor and the image-signal processor, and thus the general control processor generates a point cloud image according to the obstacle detection signal and the image detection signal. The present disclosure distributes computation power to the plurality of processors, such that requirements on the processing power of the processor are lowered and costs of the processors are reduced. In addition, distributing the computation power to the plurality of processors further avoids reliability problems of a high temperature and a large amount of computation caused by concentrating the computation power in a single processor.

Figure 3:
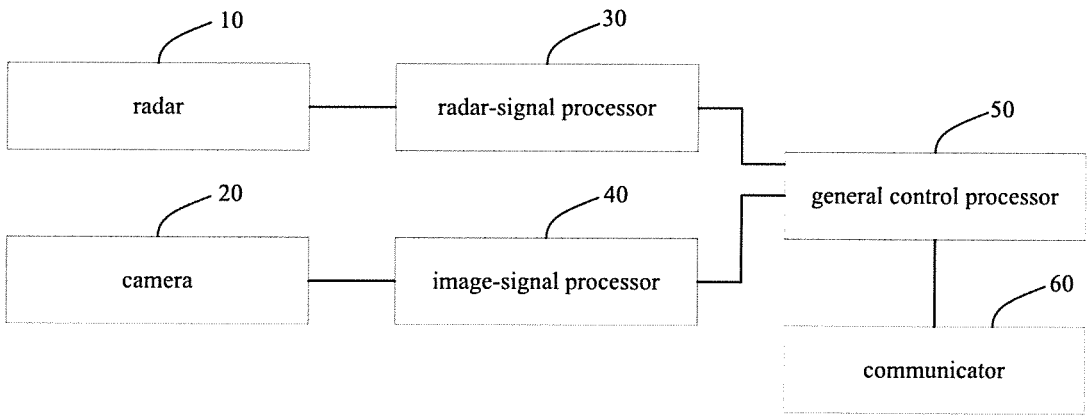
FIG. 3 is a structure schematic diagram of an intelligent roadside unit according to yet another embodiment of the present disclosure.

FIG. 3 is a structure schematic diagram of an intelligent roadside unit according to yet another embodiment of the present disclosure. As shown in FIG. 3, on the basis of FIG. 1, the intelligent roadside unit further includes: a communicator 60.

The communicator 60 is coupled to the general control processor 50. The general control processor 50 is configured to send the point cloud image to the self-driving vehicle or the server around the intelligent roadside unit through the communicator 60.

The communicator 60 may be an antenna or a wireless connection device.

Figure 4:
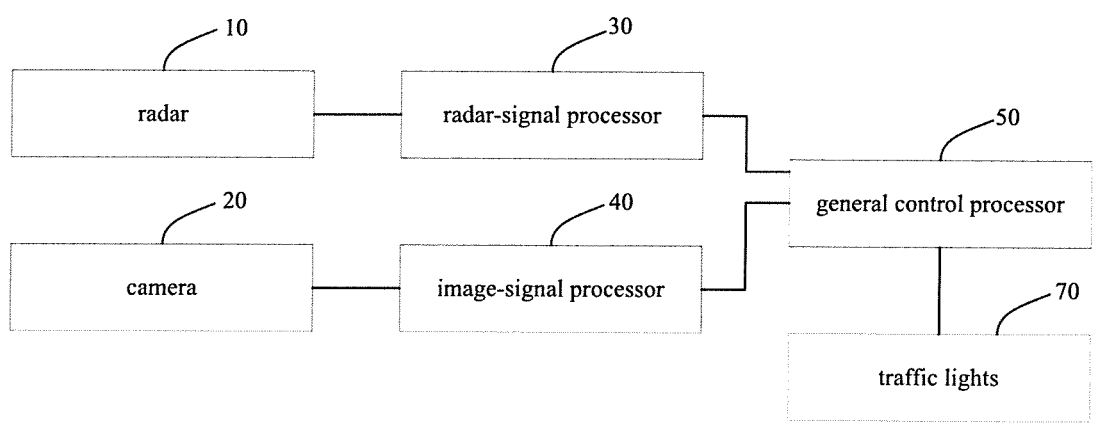
FIG. 4 is a structure schematic diagram of an intelligent roadside unit according to still yet another embodiment of the present disclosure.

FIG. 4 is a structure schematic diagram of an intelligent roadside unit according to still yet another embodiment of the present disclosure. As shown in FIG. 4, on the basis of FIG. 1, the intelligent roadside unit further includes: traffic lights 70.

Specifically, the general control processor 50 is configured to control the traffic lights 70 according to the point cloud image. Consequently, the applicability of the intelligent roadside unit is further improved.

In an embodiment of the present disclosure, the intelligent roadside unit further includes a shielding layer wrapping around at least part of the camera 20.

In a possible implementation, the shielding layer wraps around the camera 20 except for a lens and a heat dissipation portion.

Consequently, wrapping around the camera 20 excluding the lens and the heat dissipation portion with a shielding material may eliminate interferences caused by components such as the radar 10 and the antenna on the camera 20, thereby increasing an imaging clarity of the camera 20 and further improving the reliability of the intelligent roadside unit.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without contradictions.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An intelligent roadside unit, comprising:
a radar, configured to detect an obstacle within a first preset range of the intelligent roadside unit;

at least one camera, configured to capture an image within a second preset range of the intelligent roadside unit;

a radar-signal processor, coupled to the radar and configured to generate an obstacle detection signal according to obstacle information detected by the radar;

an image-signal processor, coupled to the camera and configured to generate an image detection signal according to the image captured by the camera; and a general control processor, coupled to the radar-signal processor and the image-signal processor and generating a point cloud image according to the obstacle detection signal and the image detection signal.

2. The intelligent roadside unit according to claim 1, further comprising:

a communicator coupled to the general control processor, the general control processor being configured to send the point cloud image to a self-driving vehicle or a server around the intelligent roadside unit through the communicator.

3. The intelligent roadside unit according to claim 1, further comprising:

traffic lights, the general control processor being configured to control the traffic lights according to the point cloud image.

4. The intelligent roadside unit according to claim 1, further comprising:

a shielding layer wrapping at least a part of the camera.

5. The intelligent roadside unit according to claim 4, wherein the shielding layer wraps the camera except for a lens and a heat dissipation portion.

6. The intelligent roadside unit according to claim 1, wherein the radar comprises:

a first radar; and a second radar, wherein a detection range of the first radar is broader than a detection range of the second radar, and the radar-signal processor comprises a first radar-signal processor and a second radar-signal processor coupled to the first radar and the second radar respectively.

7. The intelligent roadside unit according to claim 6, wherein the first radar and the second radar are laser radars.

8. The intelligent roadside unit according to claim 7, wherein the first radar is a 64-channel laser radar, and the second radar is a 16-channel laser radar.

9. The intelligent roadside unit according to claim 6, wherein the first radar is a laser radar, and the second radar is a millimeter-wave radar.

10. The intelligent roadside unit according to claim 6, wherein the first radar is arranged above the camera and the second radar is arranged below the camera.

11. The intelligent roadside unit according to claim 1, comprising a plurality of cameras, wherein the plurality of cameras correspond to intersections monitored by the intelligent roadside unit respectively.

* * * * *